US011253997B2

(12) United States Patent
Spies et al.

(10) Patent No.: US 11,253,997 B2
(45) Date of Patent: Feb. 22, 2022

(54) METHOD FOR TRACKING MULTIPLE TARGET OBJECTS, DEVICE, AND COMPUTER PROGRAM FOR IMPLEMENTING THE TRACKING OF MULTIPLE TARGET OBJECTS FOR THE CASE OF MOVING OBJECTS

(71) Applicant: Robert Bosch GmbH, Stuttgart (DE)

(72) Inventors: Markus Spies, Karlsruhe (DE); Johannes Maximilian Doellinger, Leonberg (DE); Liangcheng Fu, Sichuan Province (CN)

(73) Assignee: Robert Bosch GmbH, Stuttgart (DE)

(*) Notice: Subject to any disclaimer, the term of this patent is extended or adjusted under 35 U.S.C. 154(b) by 560 days.

(21) Appl. No.: 16/260,703

(22) Filed: Jan. 29, 2019

(65) Prior Publication Data
US 2019/0232487 A1    Aug. 1, 2019

(30) Foreign Application Priority Data
Feb. 1, 2018   (DE) .......................... 102018201570.8

(51) Int. Cl.
G05B 19/04    (2006.01)
B25J 9/16     (2006.01)
G05B 13/02    (2006.01)

(52) U.S. Cl.
CPC ............ B25J 9/161 (2013.01); G05B 13/027 (2013.01)

(58) Field of Classification Search
CPC ......... G05B 13/027; G05B 2219/37436; B25J 9/161; B25J 9/1676
See application file for complete search history.

(56) References Cited

U.S. PATENT DOCUMENTS

| 2008/0201116 A1* | 8/2008 | Ozdemir ............ G08B 21/0423 703/2 |
| 2019/0004524 A1* | 1/2019 | Wang ................. G01C 21/3415 |
| 2019/0049239 A1* | 2/2019 | Natroshvili ........ G06K 9/00838 |

OTHER PUBLICATIONS

C. Chen et al., "Dynamic environment modelling with gridmap: a multiple-object tracking application," Control, Automation, Robotics and Vision, 2006, ICARCV'06, 9th International Conference, pp. 1-6.

(Continued)

*Primary Examiner* — Harry Y Oh
(74) *Attorney, Agent, or Firm* — Norton Rose Fulbright US LLP; Gerard Messina (57) ABSTRACT

A method for tracking multiple target objects, moving objects to be tracked being projected onto a grid map having grid cells, the method including the following tasks to be executed in each time: computing the velocity distribution for the next time step with the aid of a transition velocity distribution, which indicates how the objects associated with a grid cell in question move from one time step to the next, based on the preceding velocity distribution; for each grid cell, calculating a transitional probability information item, which indicates, for objects in each grid cell, probabilities of the objects in question reaching possible, further grid cells, as a function of the velocity distribution; calculating an occupancy probability for each grid cell for a subsequent time, based on the transitional probability information item; operating a system as a function of the occupancy probabilities for the grid cells.

8 Claims, 6 Drawing Sheets

(56) References Cited

OTHER PUBLICATIONS

T. Gindele et al., "Bayesian Occupancy Grid Filter for Dynamic Environments Using Prior Map Knowledge," IEEE 2009, p. 669.
Z. Wang et al., "Modelling Motion Patterns of Dynamic Objects by IOHMM," 2016, IEEE/RSJ International Conference an Intelligent Robots and Systems, Sep. 14-18, 2014, pp. 1832-1838.

* cited by examiner

Fig. 1

|   | V⁺ | | | |
|---|---|---|---|---|
| V | N | E | S | W |
| N | 0.3 | 0.15 | 0 | 0 |
| E | 0 | 0 | 0 | 0 |
| S | 0 | 0.15 | 0.2 | 0 |
| W | 0.15 | 0 | 0.15 | 0 |

Fig. 4D

METHOD FOR TRACKING MULTIPLE TARGET OBJECTS, DEVICE, AND COMPUTER PROGRAM FOR IMPLEMENTING THE TRACKING OF MULTIPLE TARGET OBJECTS FOR THE CASE OF MOVING OBJECTS

RELATED APPLICATION INFORMATION

The present application claims priority to and the benefit of German patent application no. 10 2018 201 570.8, which was filed in Germany on Feb. 1, 2018, the disclosure of which is incorporated herein by reference.

FIELD OF THE INVENTION

The present invention relates to a method for identifying occupancy probabilities of grid cells of a grid map of a local environment, in order to track multiple target objects.

BACKGROUND INFORMATION

To control a robot in busy environments, in which many objects, that is, persons and/or mobile units, move independently of each other, it is important to detect and predict the movement trajectories of the individual objects, in order to prevent collisions. To that end, the robot generates an abstract model of the environment, using sensor readings. However, since measurements are often uncertain and the movement behavior of persons and/or mobile units is often not deterministic, probability methods are used.

Previous methods have been able to predict the movement of individual persons. This requires detection of the individual persons and their movement, which means that a separate prediction may be made for each of the detected persons. However, such methods are highly complex.

Instead, in the case of methods for tracking multiple target objects, individual objects are not monitored, but grid cells of a two-dimensional grid map are scanned and recognized as occupied or not occupied, with the aid of sensor devices, such as laser scanning devices. The advantage of this approach is that a less sophisticated sensor system may be used, since not every person in the environment must be monitored individually.

The detection, tracking and prediction of movements of objects in the environment of the robot, using so-called methods for tracking multiple target objects, are based, as a rule, on Bayesian filtering methods.

The use of such a method is known from C. Chen et al, "Dynamic environment modelling with gridmap: a multiple-objekt tracking application," Control, Automation, Robotics and Vision, 2006, ICARCV '06, 9th International Conference, pages 1-6. It states that objects are projected onto a two-dimensional grid, and their position and movement are tracked in the form of occupied grid cells. In this manner, uncertainties in the measurements and a transition model may be integrated directly in the computational method.

In a further approach known, for example, from T. Gindele et al., "Bayesian Occupancy Grid Filter for Dynamic Environments Using Prior Map Knowledge," IEEE 2009, page 669, Institute for Anthropomatics, the movement of objects as a function of their immediate surroundings is considered in the prediction of movement trajectories. To that end, an occupancy filter is used in order to represent the environment as a two-dimensional grid map made up of grid cells, which contain an information item about their occupancy and velocity. In particular, the modeling uncertainty of the accelerations of the objects represented by the grid cells is modeled, which means that variations in velocity may be taken into account more effectively. In this manner, a model of the environment is provided, in order to allow safe movement of a robot and to prevent collisions with moving objects.

The printed publication of Z. Wang et al., "Modelling Motion Patterns of Dynamic Objects by IOHMM," 2016, IEEE/RSJ International Conference on Intelligent Robots and Systems, Sep. 14-18, 2014, pages 1832-1838, describes an approach of modeling patterns of motion of dynamic objects in an environment represented by a grid map. To that end, each occupied grid cell is modeled in view of the monitoring of the adjacent grid cells in the preceding time step. The transitional probabilities are a function of the occurrence of events in the neighboring cells of the grid cell in the subsequent time step. In this manner, spatial correlations of dynamic movements through the grid cell may be modeled.

SUMMARY OF THE INVENTION

The present invention provides a method for tracking multiple target objects according to the description herein, as well as the device and the system according to the other descriptions herein.

Further refinements are indicated in the further descriptions herein.

According to a first aspect, a method for tracking multiple target objects is provided; moving objects to be tracked being projected onto a grid map having grid cells; the method including the following steps to be executed in each time step:

calculating the velocity distribution P(V) for the next time step with the aid of a transitional velocity distribution $P(V|V^-)$, which indicates how the objects associated with a grid cell in question move from one time step to the next, based on the preceding velocity distribution $P(V^-)$;

for each grid cell, calculating a transitional probability information item P(T), which indicates, for objects in each grid cell, probabilities of the objects in question reaching possible, further grid cells, as a function of transitional velocity distribution P(V);

calculating an occupancy probability P(O) for each grid cell for a subsequent time step, on the basis of transitional probability information item P(T);

operating a system as a function of the occupancy probabilities for the grid cells.

According to one specific embodiment, a velocity distribution and occupancy probability for each grid cell may be provided initially.

The transitional velocity distribution for each grid cell may be calculated as a function of a supplied plan, with the aid of a trained neural network and with the aid of a multivariate Gaussian model.

In particular, using the multivariate Gaussian model, the transitional velocity distribution may be ascertained from an acceleration distribution ascertained from the transitional velocity distribution, with the aid of a neighboring transitional velocity distribution obtained with the aid of the neural network.

In addition, the transitional velocity distribution for a grid cell in question may be ascertained, in that:

an acceleration distribution is ascertained from the neighboring transitional velocity distribution by subtraction;

the acceleration distribution is expanded to a range of grid cells with the aid of the multivariate Gaussian model, and rendered discrete for grid cells situated about the grid cell in question; and the velocity distribution for the next time step is ascertained from the expanded acceleration distribution in the grid cells situated about the grid cell in question.

The neural network may be provided, in that:

measurement data regarding occupancies of grid cells over a number of time steps are provided in one or more training environments, which are described by one or more training plans;

for each grid cell, frequencies of each combination of occupancies of adjacent grid cells are determined, the frequencies each indicating how often the condition is satisfied, that a particular, adjacent grid cell is occupied in the preceding time step, that the grid cell in question is occupied in the current time step, and that a particular, adjacent grid cell is occupied in a subsequent time step;

probabilities are ascertained from the frequencies for each of the grid cells, in order to obtain a neighboring transitional velocity distribution for training;

the neural network, in particular, of a convolutional neural network, is trained, using the neighboring transitional velocity distribution for training and the one or more training plans.

In addition, the neighboring transitional velocity distribution for each grid cell of the grid map of the defined local environment may be modeled as a function of the specified plan and the trained neural network.

The measurement may indicate an occupancy and/or velocity of one or more of the grid cells in a current time step, the occupancy probability being corrected on the basis of the measurement.

In particular, a robot may be controlled as a function of the occupancy probability for the grid cells.

According to a further aspect, a device for executing a method of tracking multiple target objects is provided; moving objects to be tracked being projected onto a grid map having grid cells; in each time step, the device being configured:

to calculate a velocity distribution for the next time step with the aid of a transitional velocity distribution, which indicates how the objects associated with a grid cell in question move from one time step to the next, based on the preceding velocity distribution;

to calculate, for each grid cell, a transitional probability information item as a function of the velocity distribution, the transitional probability information item indicating, for objects in each grid cell, probabilities of the objects in question reaching possible, further grid cells;

to calculate an occupancy probability for each grid cell for a subsequent time step, based on the transitional probability information item:

to operate a system as a function of the occupancy probabilities for the grid cells.

One idea of the above-mentioned method is to take into account transitional probabilities of objects in each grid cell, for a method of tracking multiple target objects.

For each of the grid cells of the grid plan, the neighboring transitional velocity distribution indicates the probability that a movement to an adjacent grid cell will occur in the next time step. This probability information is specified as a function of the direction, from which each of the objects of the grid cells occupied in a preceding time step have arrived at the grid cell in question. Thus, in the case of a rectangular grid, sixteen neighboring transitional velocity distributions are yielded for each grid cell in question, namely, for each direction of movement of the objects into the grid cell in question, four transitional probabilities for the four possible directions of movement in adjacent grid cells in the next time step.

In particular, the modeling of the neighboring transitional velocity probability for each grid cell renders possible a probable movement path of objects along movement trajectories, since a transition to the grid cell in question and a transition from the grid cell in question are provided separately with a transitional probability. Therefore, probable trajectories through a grid cell may result, which are projected on actual paths of movement along an environment portrayed by the grid map.

A neural network for predicting neighboring transitional velocity distributions may be trained with the aid of simulated or actual data in a training environment, using a neural network. In addition, the training is carried out for one or more training plans, in order to bring the movement behavior into line with the topology of the actual training environment. By training the neural network, which may be configured, in particular, as a convolutional neural network, patterns of movement in bounded environments, such as interior spaces, may be learned.

If the method for tracking multiple target objects is used in a modified local environment, this may be depicted, using a corresponding plan. Then, with the aid of the trained neural network, neighboring transitional velocity distributions (probabilities) may be ascertained for each of the grid cells. Consequently, patterns of movement along boundaries/walls at junctions may be learned. The transitional probabilities may now be used for improved tracking of moving objects.

In a prediction step of the expanded Bayesian occupancy grid map filter (BOF), a new occupancy probability and velocity distribution is estimated with the aid of the predicted transitional probability. In contrast to previous methods, in which a constant velocity is assumed and the environment has been taken into account in the form of forbidden transitions between the grid cells, occupancy probabilities and velocity distributions may now be estimated on the basis of the predicted, more accurate transitional probabilities. This renders possible an improved prediction in methods for tracking multiple target objects, which, until now, have considered the environment only in the form of forbidden or permitted transitions.

Specific embodiments are explained in greater detail in the following, on the basis of the attached drawing.

DETAILED DESCRIPTION

Figure 1:
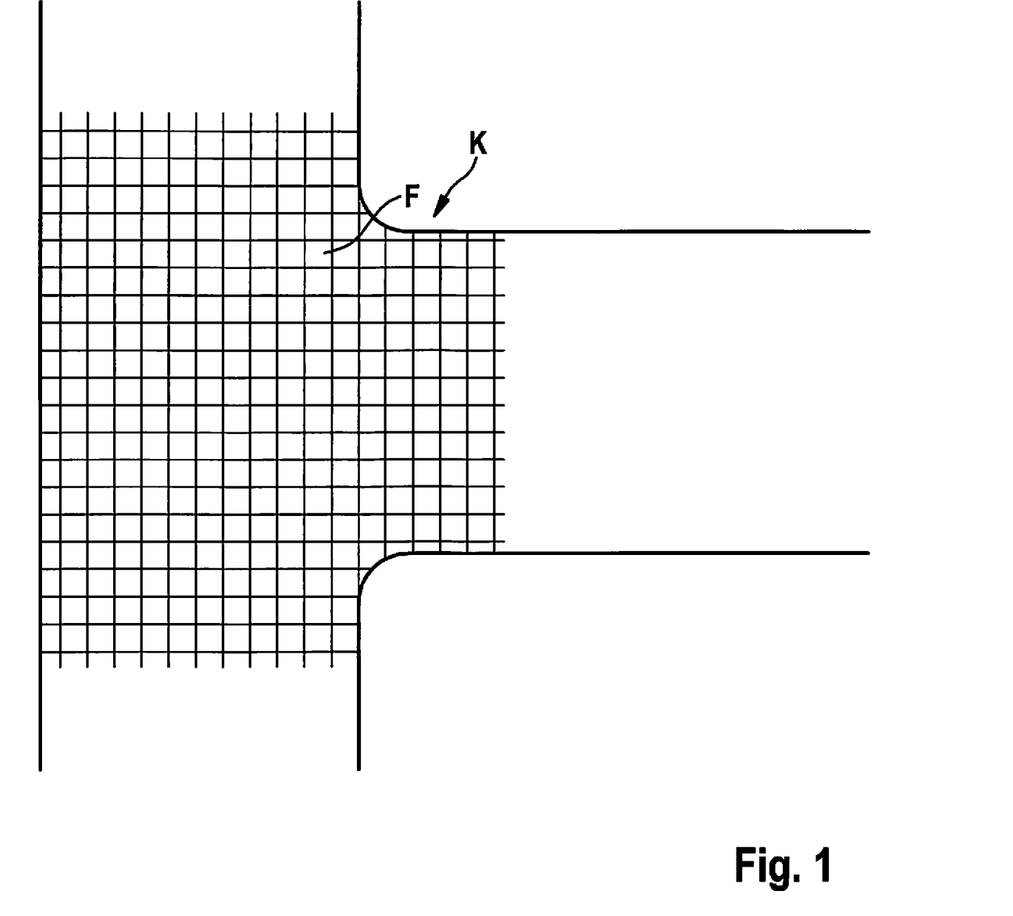
FIG. 1 shows a representation of a local environment, which is subdivided with the aid of a grid map, in order to implement a method of tracking multiple target objects.

FIG. 1 shows a representation of a local environment in the form of a branching corridor (T-intersection). The local environment is subdivided into grid cells F with the aid of a grid map K, in order to execute a method of tracking multiple target objects. Grid cells F subdivide grid map K into segments of equal size in accordance with a Cartesian coordinate system, so that each of grid cells F represents a rectangular or square surface segment of the local environment.

The analysis takes place in consecutive time steps.

For each time step, each of grid cells F may be associated with information items, which indicate one or more states of the surface segment of the local environment denoted by grid cell F.

Thus, a grid cell F may be preassigned an occupancy information item, which indicates that at least one moving object is associated with the grid cell F in question, that is, that the at least one moving object is located in the corresponding surface segment. The occupancy information for all grid cells 1 . . . n may be indicated by an occupancy vector O for all grid cells F, having element values of occ (occupied) and nocc (not occupied), $$O = \begin{pmatrix} O_1 \\ \vdots \\ O_n \end{pmatrix} \in \{occ, nocc\}^n.$$

In addition, each grid cell F may be preassigned a velocity information item, which indicates the velocity at which the objects associated with grid cells F move, e.g., by a vector V, which includes the velocity in the x- and y-directions. The velocity information may be discretized into a number of grid cells per time step.

$$V = \begin{pmatrix} V_1 \\ \vdots \\ V_n \end{pmatrix} \in \{Z \times Z\}^n$$

In the following, the combination of O and V is referred to as X:

$$X=(O,V)$$

The following applies to a time step preceding the time step presently considered:

$$X^-=(O^-,V^-)$$

In particular, each grid cell F may be preassigned a measuring vector Z, which indicates, in accordance with a sensor measurement, an occupancy identification and/or a velocity information item for the grid cell F in question.

$$Z=(Z_O,Z_V), Z_O \in \{occ,nocc\}^n, Z_V \in \{z \times z\}^n$$

This measuring vector may be used for updating the occupancy information. To this end, P(O) and P(Z|O) are simply multiplied, in order to obtain P(O⁻) of the preceding time step.

$$P(O|Z) = P(Z|O)\frac{P(O)}{P(Z)} \sim P(Z|O)P(O)$$

Each grid cell F may also be assigned a transitional probability information item in the form of a transition matrix P(T), which specifies a transitional probability for every possible path of movement through the grid cell Z in question. Such a transition matrix P(T) specifies the transitional probabilities from each grid cell F to every other or the same grid cell.

That is, for each grid cell F, the transitional probabilities indicate the probability that the same or one of the other grid cells F will be occupied in a subsequent time step.

Transitional probability information item P(T) is determined as a function of current velocity distribution P(V) and indicates the probability that the objects inside of the grid cell in question will move into another specific grid cell or in the same grid cell.

For a defined local environment, the neighboring transitional velocity probability matrix, which represents the neighboring transitional velocity distribution, is yielded from an evaluation of actual or modeled measurement data in a training environment, in that the following method is carried out over all of the measurement data.

Figure 3:
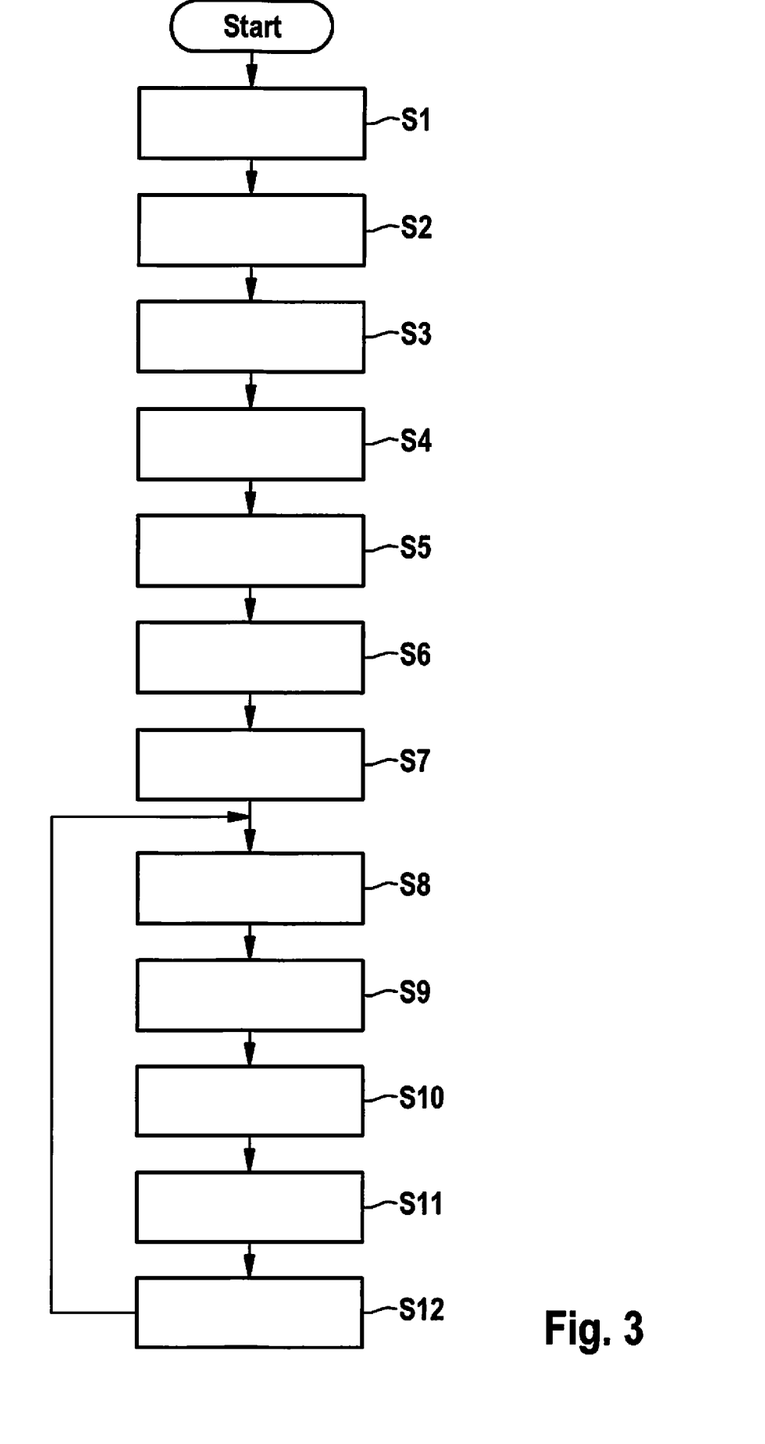
FIG. 3 shows a flow chart for illustrating a method of ascertaining a transition matrix.

The method is explained with the aid of the flow chart of FIG. 3.

In step S1, measurement data about occupancies of grid cells of a grid map, which represents a training environment, are provided over a number of time steps. The training environment is described, using a training plan. The training plan or specified plan, for which the described method of tracking multiple target objects is intended to be executed, may specify information about the local environment in a suitable manner, for example, in the form of an image, floor plan, accessibility matrix or the like.

In step S2, frequencies of each combination of occupancies of adjacent grid cells F are determined for each grid cell F. Thus, 16 frequencies result, which each indicate how often the condition is satisfied, that a particular, adjacent grid cell F is occupied in the preceding time step, that the grid cell in question is occupied in the current time step, and that a particular, adjacent grid cell is occupied in a subsequent time step.

In step S3, probabilities are ascertained from the frequencies for each of the grid cells, in order to obtain a neighboring transitional velocity distribution for training. As a function of the total number of satisfied conditions, corresponding probabilities for the transitions to and from the grid cell F in question are ascertained from the frequencies. Together with the plan of the local environment, which is specified in the training plan, the neighboring transitional velocity distributions for training obtained in this manner constitute the training data for a machine learning method used subsequently.

In step S4, a neural network, in particular, a convolutional neural network, is trained, using the neighboring transitional velocity distribution for training and the training plan. For the training, a plurality of neighboring transitional velocity distributions for training may also be used for a plurality of training plans. Consequently, the convolutional neural network is trained on the basis of the training data of the neighboring transitional velocity distributions for training and the local environment underlying the training data, so that the patterns of movement, which are specified by the transitional probabilities, are set in relation to the movement spaces of the local environment, and rules are learned accordingly. During training, an information item regarding the training plan is applied on the input side, and the outputs of the neural network are accordingly trained to the neighboring transitional velocity distribution.

Figure 2:
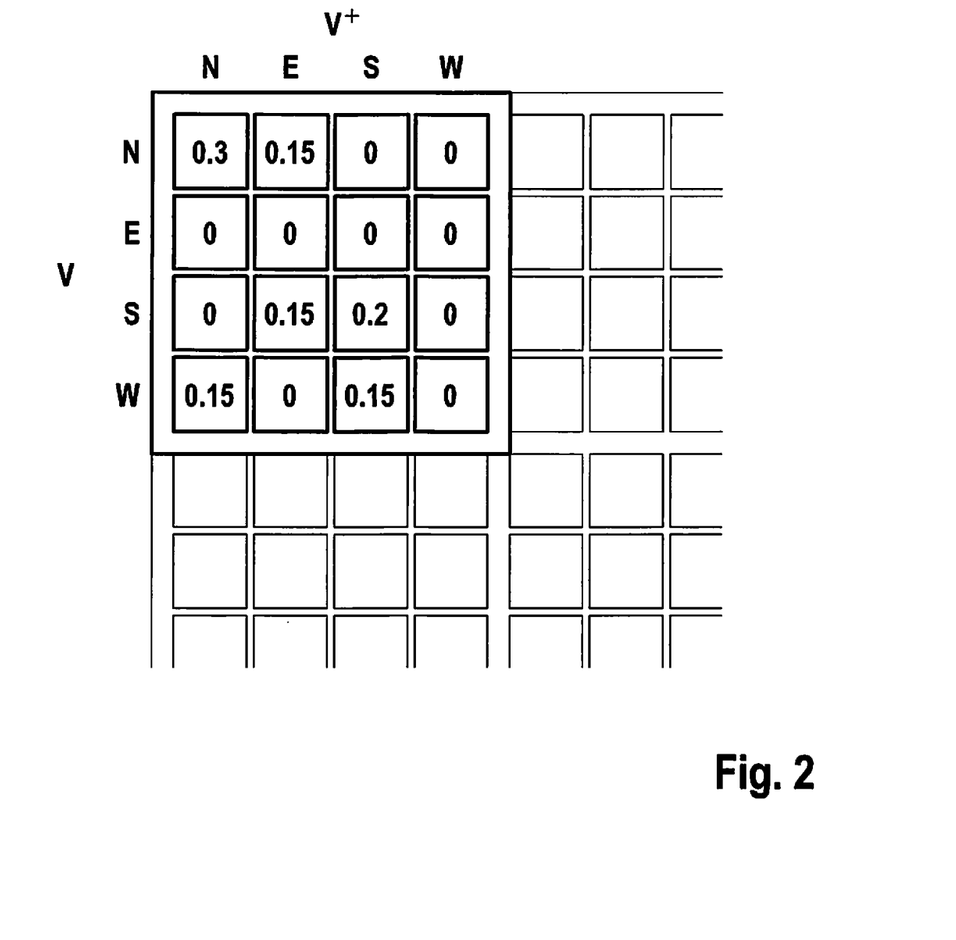
FIG. 2 shows an exemplary representation of a neighboring transitional velocity distribution associated with a grid cell in question.

In FIG. 2, a neighboring transitional velocity probability matrix is illustratively shown as an example of a neighboring transitional velocity distribution, as is predicted, for example, using a network. The neighboring transitional velocity distribution essentially corresponds to the transitional velocity matrix, except that it is only defined for the 4×4 velocity combinations of the adjacent cells.

In step S5, a transitional probability information item for each grid cell of a grid map of the defined local environment is modeled as a function of the specified plan of the local environment. Thus, by specifying the plan of the local environment, a neighboring transitional velocity distribution for each grid cell may be specified with the aid of the trained neural network.

In step S6, a transitional velocity distribution is calculated for each grid cell from the transitional probabilities of the neighboring transitional velocity distribution, which the aid of the multivariate Gaussian model.

In step S7, the occupancy probability and velocity distribution P(V) for each cell is initialized arbitrarily (for example, constantly).

In step S8, a transition matrix P(T) is calculated from current velocity distribution P(V).

$$P(T=t) = \sum_{V^-} \prod_{a \in N} \mu_a(P(V_a^-)) P(T_a = t_a | V_a^-)) = \prod_{a \in N} \mu_a(P(V_a^- = v(a, t_a))$$

The transition matrix results from the probabilities of current velocities P(V). In this context, it is assumed that the occupancies in each grid cell continue to move according to the velocity distributions.

In step S9, the occupancy probability P(O) for the next time step is calculated with the aid of the transitional probabilities P(T) and the occupancy probabilities of the last time step P(O$^-$).

The occupancy probability is derived as follows:

$$P(O_c = occ) = 1 - P(O_c = nocc) = 1 - \prod_{a \in N}(1 - P(O_a^- = occ)P(T_a = c))$$

where P(O$_c$=occ) corresponds to the probability that grid cell c is occupied, P(O$_c$=nocc) corresponds to the probability that grid cell c is not occupied, N corresponds to the number of all grid cells, and P(T$_a$=c) corresponds to the probability that one or more objects will move from grid cell a to grid cell c.

Based on the occupancy prediction, a robot may be moved in a manner known per se, in order to prevent a collision.

In step S10, the naïve velocity distribution P($\check{V}_c$) is predicted with the aid of transitional probabilities P(T) and the velocity distribution of the last time step P(V$^-$).

$$P(\hat{V}_c = v(a, c)) = \sum_{O^-, T} P(O^-) P(T) P(\hat{V}_c = v(a, c) | O^-, T) = P(O_a^- = occ) P(T_a = c)$$

In step S11, the environmentally dependent velocity distribution of P(V) is predicted with the aid of transitional velocity distribution P(V|$\check{V}_c$) (transitional velocity probabilities) and naïve velocity distribution P(V). Transitional velocity distribution P(V|$\check{V}_c$) is calculated in accordance with a method subsequently executed, using a multivariate Gaussian model, which is illustrated by FIGS. 4A-4D.

In step S12, probabilities P(X) are corrected, using measuring model P(Z|X). To this end, P(O) and P(Z|O) are simply multiplied, in order to obtain P(O$^-$) of the preceding time step.

$$P(O|Z) = P(Z|O)\frac{P(O)}{P(Z)} \sim P(Z|O)P(O)$$

Instead of assuming the acceleration noise to be a normal distribution, as in previous approaches, the acceleration may also be assumed to be anisotropic. This is more compatible with an actual environment including moving persons, since they change moving direction more often and adjust walking speed markedly to the speeds of persons in the environment.

The velocity prediction is carried out from a neighboring transitional velocity distribution. As an alternative to the Gaussian normal distribution, the acceleration noise may be estimated, using the difference of the velocity probabilities in two consecutive time steps, so that corresponding accelerations are yielded.

$$P_{NN}(A, V^-)$$

Figure 4A:
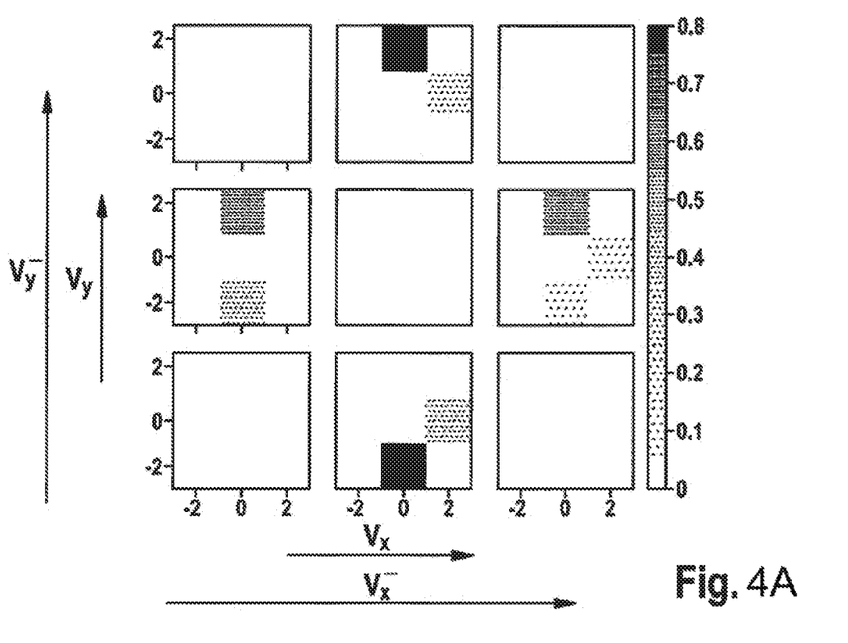
FIG. 4A shows a graphical illustration of the multivariate Gaussian Model for ascertaining a transitional velocity distribution from the neighboring transitional velocity distribution.

A graphic representation of the neighboring transitional velocity distribution is shown in FIG. 4A. In this context, in the case of an occupancy transition in the direction of a grid field, the color shading in the grid field indicates the transitional occupancy probabilities that, starting from the middle grid field in the preceding time step, a step up/down/ to the left/to the right is taken. In accordance with the training of the neural network for generating the transitional occupancy matrix, there are only corresponding probabilities for the grid cells directly adjacent to the grid cell F in question.

Figure 4B:
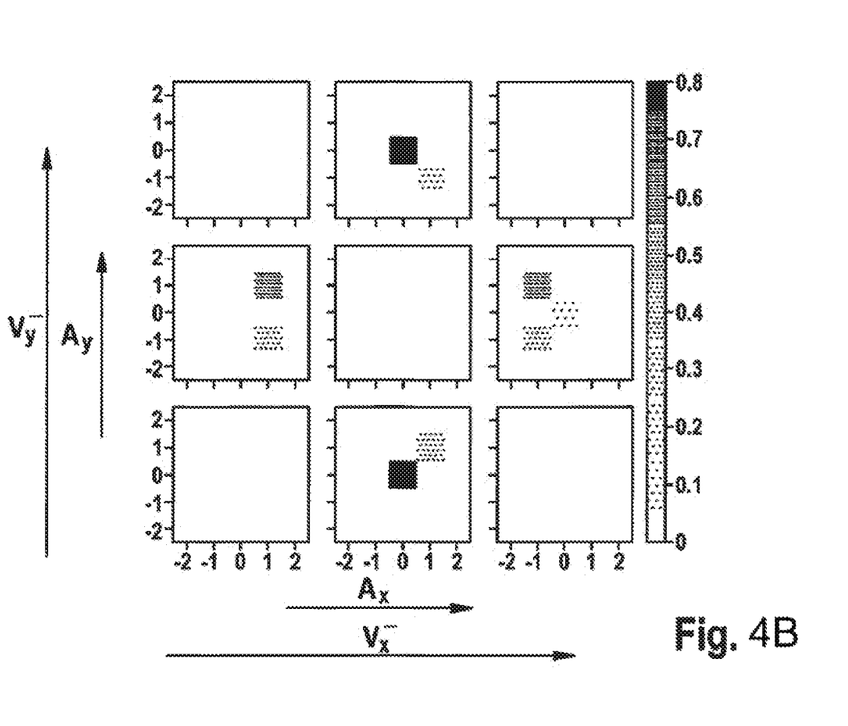
FIG. 4B shows a graphical illustration of the multivariate Gaussian Model for ascertaining a transitional velocity distribution from the neighboring transitional velocity distribution.

Acceleration distributions are subsequently ascertained from the specific velocity distributions in accordance with A=V−V$^-$, where V corresponds to a velocity between two consecutive time steps. In particular, V=R(t$_p$)−R(t$_c$) and V$^-$=R(t$_c$)−R(t$_a$), where t$_a$ is the preceding time step, t$_c$ is the current time step, and t$_p$ is a subsequent time step. R corresponds to the grid cell location of the object. One recognizes that accelerations only occur, if a change in direction of the movement has been detected.

Figure 4C:
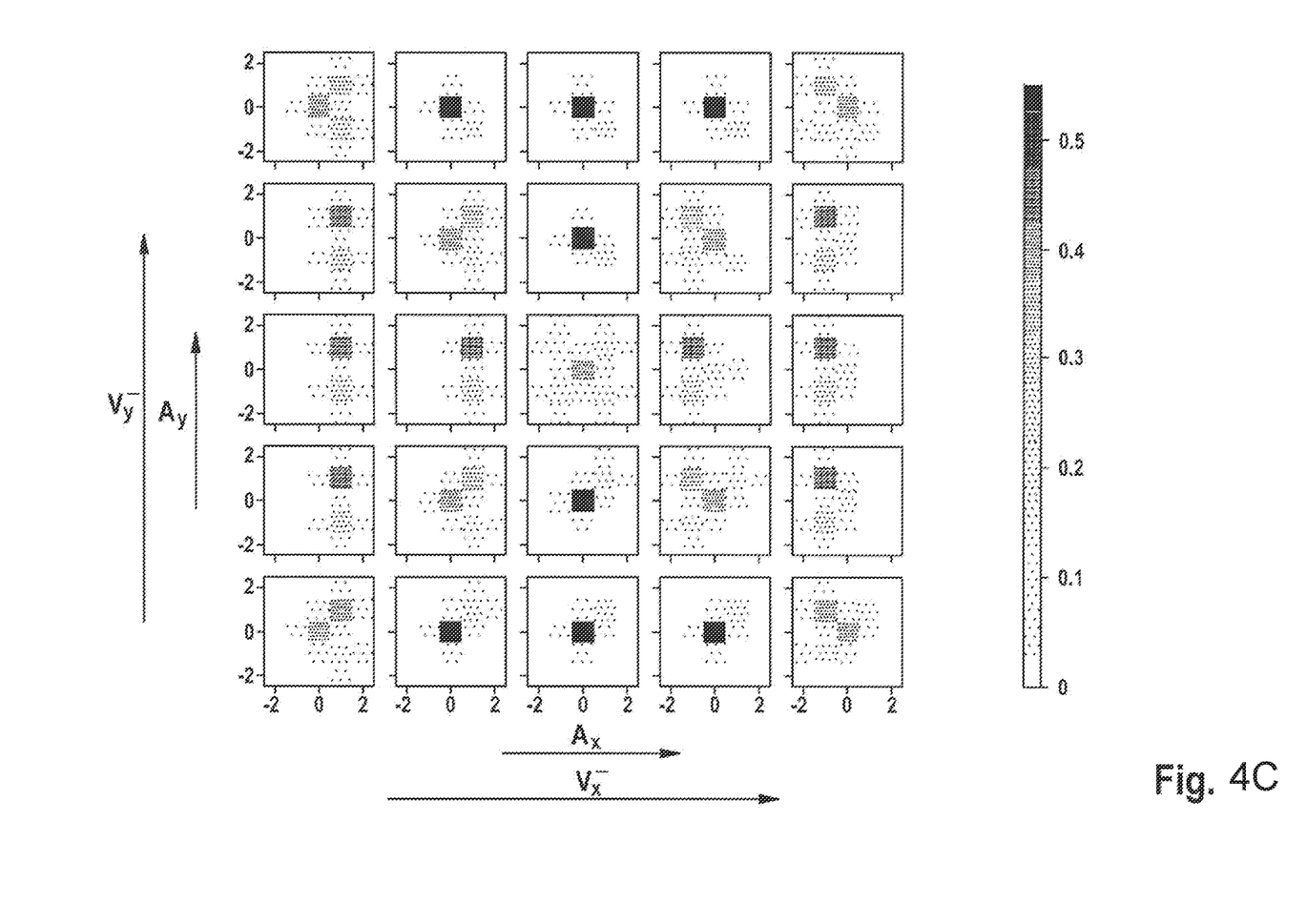
FIG. 4C shows a graphical illustration of the multivariate Gaussian Model for ascertaining a transitional velocity distribution from the neighboring transitional velocity distribution.

Subsequently, with the aid of a multivariate Gaussian model, a continuous probability distribution regarding acceleration and velocity of the last time step is calculated and evaluated for expanded A and V$^-$, the new transitions no longer having to be adjacent cells.

$$P(A, V^-) = \sum_{\tilde{A}, \tilde{V}^-} P_{NN}(\tilde{A}, \tilde{V}^-) \cdot N[(\tilde{A}, \tilde{V}^-), \Sigma](A, V^-)$$

where $P_{NN}(\tilde{A},\tilde{V}^-)$ corresponds to the 16 neighboring transitional probabilities after the transformation to the acceleration space, $N(\ldots)$ corresponds to a four-dimensional Gaussian distribution having an average value vector $(\tilde{A},\tilde{V}^-)$ and a covariance matrix $\Sigma$. The distribution is evaluated at the point $(A, V^-)$.

Figure 4D:
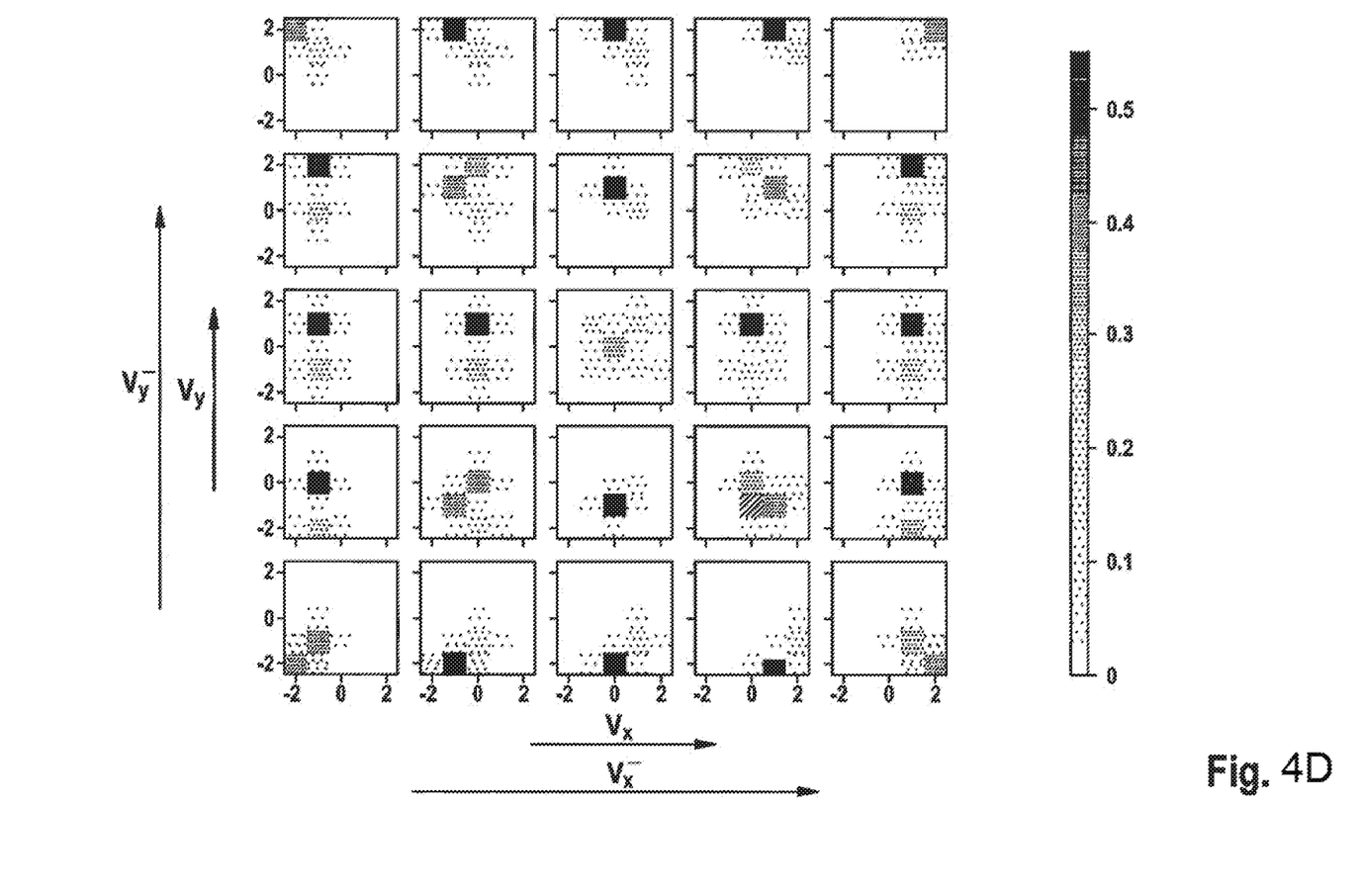
FIG. 4D shows a graphical illustration of the multivariate Gaussian Model for ascertaining a transitional velocity distribution from the neighboring transitional velocity distribution.

Now, an inverse transformation to a transitional velocity distribution, which specifies velocity distributions in accordance with $V=V^-+A$, is carried out. In this manner, one obtains $P(V, V^-)$ $$P(V) = \sum_{V^-} P(V, V^-)P(V^-)$$

What is claimed is:

1. A method for tracking multiple target objects, moving objects to be tracked being projected onto a grid map having grid cells, the method comprising:
   computing a velocity distribution for a next time step with a transitional velocity distribution, which indicates how the objects associated with a grid cell move from one time step to the next time step, based on the preceding velocity distribution;
   calculating, for each of the grid cells, a transitional probability information item, which indicates, for objects in each of the grid cells, probabilities of the objects reaching possible, further grid cells, as a function of the velocity distribution;
   calculating an occupancy probability for each of the grid cells for a subsequent time step, based on transitional probability information item; and
   operating a system as a function of the occupancy probabilities for the grid cells wherein:
      the transitional velocity distribution for each of the grid cells is calculated as a function of a supplied plan, with a trained neural network and with a multivariate Gaussian model,
      the transitional velocity distribution is ascertained from an acceleration distribution, with a neighboring transitional velocity distribution obtained with the aid of the neural network, using the multivariate Gaussian model, and
      the transitional velocity distribution for a particular grid cell is ascertained, in that:
         an acceleration distribution is ascertained from the neighboring transitional velocity distribution by subtraction;
         the acceleration distribution is expanded to a range of grid cells with the aid of the multivariate Gaussian model, and rendered discrete for grid cells situated about the particular grid cell; and
         the velocity distribution for the next time step from the expanded acceleration distribution in the grid cells situated about the particular grid cell is ascertained;
      a robot is controlled as a function of the occupancy probabilities for the grid cells.

2. The method of claim 1, wherein a velocity distribution is initially provided for each of the grid cells.

3. The method of claim 1, wherein the neural network is provided, in that:
   measurement data regarding occupancies of grid cells over a number of time steps are provided in one or more training environments, which are described by one or more training plans;
   for each of the grid cells, frequencies for each combination of occupancies of adjacent grid cells are determined, the frequencies each indicating how often the condition is satisfied, that a particular, adjacent grid cell is occupied in the preceding time step, that the particular grid cell is occupied in the current time step, and that a particular, adjacent grid cell is occupied in a subsequent time step;
   probabilities are ascertained from the frequencies for each of the grid cells, so as to obtain a neighboring transitional velocity distribution for training; and
   the neural network, in particular, of a convolutional neural network, is trained, using the neighboring transitional velocity distribution for training and the one or more training plans.

4. The method of claim 3, wherein the neighboring transitional velocity distribution for each of the grid cells of the grid map of the defined local environment is modeled as a function of the specified plan and the trained neural network.

5. The method of claim 1, wherein the measurement indicates an occupancy and/or velocity of one or more of the grid cells in a current time step, and the occupancy probability is corrected based on the measurement.

6. An apparatus for executing a method of tracking multiple target objects, moving objects to be tracked being projected onto a grid map having grid cells, comprising:
   a device configured to perform the following:
      calculating a velocity distribution for the next time step with a transition velocity distribution, which indicates how the objects associated with a particular grid cell move from one time step to the next, based on the preceding velocity distribution;
      calculating, for each of the grid cells, a transitional probability information item, which indicates, for objects in each of the grid cells, probabilities of the objects reaching possible, further grid cells, as a function of the velocity distribution;
      calculating an occupancy probability for each of the grid cells for a subsequent time step, based on the transitional probability information item; and
   operating a system as a function of the occupancy probabilities for the grid cells wherein:
      the transitional velocity distribution for each of the grid cells is calculated as a function of a supplied plan, with a trained neural network and with a multivariate Gaussian model, and
      the transitional velocity distribution is ascertained from an acceleration distribution, with a neighboring transitional velocity distribution obtained with the aid of the neural network, using the multivariate Gaussian model, and
      the transitional velocity distribution for a particular grid cell is ascertained, in that:
         an acceleration distribution is ascertained from the neighboring transitional velocity distribution by subtraction;
         the acceleration distribution is expanded to a range of grid cells with the aid of the multivariate Gaussian model, and rendered discrete for grid cells situated about the particular grid cell; and
         the velocity distribution for the next time step from the expanded acceleration distribution in the grid cells situated about the particular grid cell is ascertained;
      a robot is controlled as a function of the occupancy probabilities for the grid cells.

7. A non-transitory computer readable medium having a computer program, which is executable by a processor, comprising:
- a program code arrangement having program code for tracking multiple target objects, moving objects to be tracked being projected onto a grid map having grid cells, tby performing the following:
  - computing a velocity distribution for a next time step with a transitional velocity distribution, which indicates how the objects associated with a grid cell move from one time step to the next time step, based on the preceding velocity distribution;
  - calculating, for each of the grid cells, a transitional probability information item, which indicates, for objects in each of the grid cells, probabilities of the objects reaching possible, further grid cells, as a function of the velocity distribution;
  - calculating an occupancy probability for each of the grid cells for a subsequent time step, based on transitional probability information item; and
- operating a system as a function of the occupancy probabilities for the grid cells wherein:
  - the transitional velocity distribution for each of the grid cells is calculated as a function of a supplied plan, with a trained neural network and with a multivariate Gaussian model, and
  - the transitional velocity distribution is ascertained from an acceleration distribution, with a neighboring transitional velocity distribution obtained with the aid of the neural network, using the multivariate Gaussian model, and
  - the transitional velocity distribution for a particular grid cell is ascertained, in that:
    - an acceleration distribution is ascertained from the neighboring transitional velocity distribution by subtraction;
    - the acceleration distribution is expanded to a range of grid cells with the aid of the multivariate Gaussian model, and rendered discrete for grid cells situated about the particular grid cell; and
    - the velocity distribution for the next time step from the expanded acceleration distribution in the grid cells situated about the particular grid cell is ascertained;
- a robot is controlled as a function of the occupancy probabilities for the grid cells.

8. The computer readable medium of claim 7, wherein a velocity distribution is initially provided for each of the grid cells.

* * * * *